Patented Dec. 4, 1945

2,390,081

UNITED STATES PATENT OFFICE 2,390,081

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application June 26, 1944, Serial No. 542,236

5 Claims. (Cl. 252—341)

This invention relates to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude oil and relatively soft waters or brines. Controlled emulsification and subsequent demulsification, under the conditions just mentioned, is of significant value in removing impurities, particularly inorganic salts from pipeline oil.

Demulsification, as contemplated in the present application, includes the preventive step of commingling the demulsifier with the aqueous component which would or might subsequently become either phase of the emulsion in absence of such precautionary measure.

The new material herein described, particularly when employed as a demulsifier, consists of a compound or mixture of compounds, that comprises the ester derived by reaction between a low molal acid having less than 8 carbon atoms and a hydroxylated basic ether amine having at least one radical containing 8 carbon atoms and not more than 32 carbon atoms, with an intervening ether linkage between said high molal radical and the basic amino nitrogen atom. In the principal and preferred aspect, such type of compound may be exemplified by the following formula:

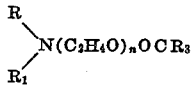

in which R is an ether radical, having as an integral part thereof, a hydrocarbon radical containing 8 carbon atoms and not more than 32 carbon atoms, and more particularly, an alkyl radical, an alicyclic-alkyl radical, or an aralkyl radical in which a carbon atom chain is interrupted at least once by an oxygen atom and at least 1 of such carbon atoms attached to an ethereal oxygen, is an acyclic carbon atom; $R_1$ may be the same as R without the lower limitation of 8 carbon atoms, or $R_1$ may be any non-aryl hydrocarbon radical having 7 carbon atoms or less, or additionally, $R_1$ may be a hydroxyalkyl including hydroxyalkyl radicals where the carbon atom chain is interrupted at least once by an oxygen atom, provided that the alkylene radicals of said immediately aforementioned alkyl and hydroxyalkyl radicals contain less than 8 carbon atoms.

Compounds of the kind above described are obtained from hydroxylated etheramines by reaction with low molal monocarboxy acids having less than 8 carbon atoms. The hydroxylated derivatives are conveniently obtained in many instances from etheramines having either one or two residual amino hydrogen atoms; for instance, a compound such as

may be reacted with an oxyalkylating agent having a reactive ethylene oxide ring. As typical examples of applicable compounds, may be mentioned epichlorhydrin, glycide, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

As to a process for preparing amines of the kind herein contemplated as reactants for combination with low molal monocarboxy acids, reference is made to U. S. Patents Nos. 2,334,517, dated November 16, 1943, to Tucker, 2,325,514, dated July 27, 1943, to Hester, and French Patent No. 837,604, dated February 15, 1939, to I. G. Farbenindustrie, A.-G.

The aforementioned U. S. Patent No 2,325,514 is concerned with compounds of the formula:

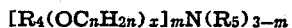

wherein $R_4$ is an aliphatic hydrocarbon group of less than 13 carbon atoms, $C_nH_{2n}$ represents an alkylene group in which $n$ is an integer having a value of 2 to 4, inclusive, $x$ is an integer of at least 1, $m$ is an integer having a value of 2 to 3, inclusive, and $R_5$ is a member of the class consisting of hydrogen, hydroxyalkyl and hydrocarbon groups.

In the instant case the utility of the product is not limited to $R_4$ in the previous formula being necessarily aliphatic, and the number of carbon atoms may be 13 or more. For instance, in a subsequent example where reference is made to octyl bromide, decyl bromide or octadecyl bromide may be used, although the reaction takes place more slowly as one employs a bromide of higher molecular weight. One may use alkylated benzyl chlorides in which alkyl groups, for instance, ethyl, propyl, amyl, or octyl groups are introduced into the aromatic nucleus. Similar products may be obtained from substituted naphthalenes by reaction with formaldehyde, and hydrochloric acid, so as to obtain the polycyclic analogs. Such procedure, involving chloromethylation is well known. The following will serve as an illustration of the reactant described immediately preceding:

*Etheramine, Example 1*

A mixture of 82 parts of triethanolamine, 66 parts of sodium hydroxide, and 318 parts of normal octyl bromide was heated at 130°–140° C. on an oil bath for four hours. The reaction mixture was then cooled, washed with water, dried over sodium sulfate, and distilled under reduced pressure. A fraction distilling between 165° C. and 185° C. at 3 mm. pressure was chiefly $$(C_8H_{17}OC_2H_4)_2NC_2H_4OH$$

with a small amount of the mono-octyloxyethyl ethanolamine. The fraction distilling between 185° C. and 205° C. was practically pure bisoctyloxyethyl ethanolamine.

*Etheramine, Example 2*

Decyl bromide is substituted for octyl bromide in the preceding example.

Other suitable reactants are described in U. S. Patent No. 2,334,517, dated November 16, 1943, to Tucker. Said Tucker patent is concerned with compounds of the formula:

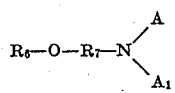

wherein $R_6$ is an alkyl radical having 8 to 22 carbon atoms, $R_7$ is a hydroxyalkylene radical having not more than 4 carbon atoms connected to $R_6$ through an ether linkage, A is selected from the group consisting of hydrogen, an alkyl radical and an alkylol radical, and $A_1$ is an alkylol radical, the radicals represented by A and $A_1$ each having not more than 4 carbon atoms.

Typical compounds described in the aforementioned Tucker patent and the method of making same, may be illustrated by the following brief description, which is substantially verbatim as it appears in the aforementioned Tucker patent:

*Etheramine, Example 3*

In a known manner lauryl alcohol is reacted with epichlorhydrin in the presence of a suitable catalyst such as stannic chloride, antimony pentachloride, boron trifluoride, or perchloric acid, to produce lauryl monochlorhydrin ether. Although good yields of lauryl monochlorhydrin ether are obtained under normal conditions of reaction, it may be desired to obtain a substantially pure product, in which case the products of the above reaction may be dissolved in ether and washed with water and subsequently fractionally distilled.

56 parts of the lauryl monochlorhydrin ether thus formed are mixed with 23 parts of diethanolamine, and the mixture is heated with stirring for about 2½ hours at 170°–180° C. Residual hydrochloric acid may then be eliminated by boiling the reaction mix with caustic soda solution for a brief period. If desired, this product may be purified by washing an ether solution of same with water, following which the product may be recovered from the ether solution.

A product prepared in accordance with this example consisted predominantly of a compound having the formula:

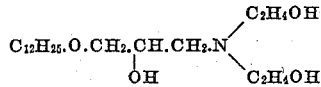

*Etheramine, Example 4*

The lauryl monochlorhydrin ether prepared in Example 3, is converted to lauryl glycidyl ether by refluxing at atmospheric pressure a mixture of 60 parts of the monochlorhydrin ether with 12 parts of sodium hydroxide in 20 parts of water. The ether is washed with water and subsequently recovered.

To 48 parts of the lauryl glycidyl ether are added 20 parts of morpholine, and the mixture is heated to refluxing at 150°–160° C. under a blanket of nitrogen. After the reaction has reached substantial completion, as is indicated when a sample of the reaction mix dissolves to a clear solution in a normal hydrochloric acid solution, the excess or unreacted morpholine may be removed by continuing the heating under vacuum and passing a stream of nitrogen gas therethrough. A product prepared in accordance with the above procedure will closely correspond to one having the following formula:

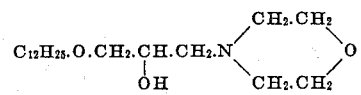

*Etheramine, Example 5*

Tetradecyl glycidyl ether is prepared in a manner similar to that employed in the preparation of lauryl glycidyl ether above described.

To 54 parts of the tetradecyl glycidyl ether are added 49 parts of trimethylolaminomethane corresponding to the ratio of 1 mole of ether to 2 moles of amine, and the mixture is stirred while slowly heating to 170° C. Reaction is allowed to proceed at 170°–180° C. for about an hour, after which the product is freed from excess amine by washing an ether solution of the reaction product with brine. A product so prepared consisted predominantly of a compound having the formula

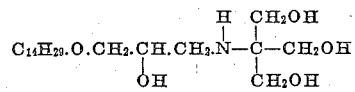

Additional reactants are described in French Patent No. 837,604, dated February 15, 1939, to I. G. Farbenindustrie, previously mentioned. Said French patent is concerned with the preparation of condensation products produced by reacting compounds containing at least one alcoholic group bound to a basic nitrogen atom in the presence of alkaline metallic compounds, with compounds of the formula $X—R_8$, in which $R_8$ equals an alkyl cycloalkyl, aralkyl, aryl, or a heterocyclic radical, and $X$ is a halogen atom or a group capable of being replaced. Particular reference is made to that part of the aforementioned French patent which is concerned with preparation of a product of the following formula:

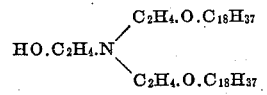

Similarly, other directions are concerned with the production of products of the formula type

Particular attention is directed to said French patent for the reason that it illustrates compounds in which the high molal groups substituted for aminohydrogen atoms, may contain as many as 32 carbon atoms and may contain cyclic structures of various kinds, as enumerated in the first claim of said French patent.

The amino nitrogen atom must be free from directly linked acyl radicals or aryl radicals. Stated another way, the nitrogen atom must be a basic amino nitrogen atom. See "Textbook of Organic Chemistry," Richter, 2nd edition, page 253.

Previous reference to French Patent No. 837,604 is concerned with manufacture of etheramines from high molal halides such as chlorides or bromides. Although such high molal halides can be obtained in various ways, they are most conveniently obtained from alcohols, which, in turn, are obtained from high molal acids. Such alcohols may be produced from naphthenic acids, resin acids, fatty acids, oxidized petroleum acids, or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted as indicated in the aforementioned French Patent No. 837,604. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, such amines include a hydroxylated hydrocarbon radical.

In view of what has been said, it will be noted that the group introduced into the amine molecule in a manner so as to involve at least one ether linkage and derived at least hypothetically from an acid, is really the carbon atom chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom, or a small number of hydrogen atoms, have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not relied upon to supply points of chemical activity, as far as the herein contemplated compounds are concerned. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxyhydrocarbon type of the kind in which the hydroxyl group does not materially reduce the hydrophobe character of the hydrocarbon group, as, for example, the group or radical which would be obtained from ricinoleic acid. The presence of such hydroxy radical would require an extra mole of carboxy acid, to insure an ester radical of the kind hereinafter described.

In addition to synthetic carboxy acids obtained by the oxidation of paraffins or the like, there is the somewhat analogous class obtained by treating carbon dioxide or carbon monoxide in the presence of hydrogen or an olefine, with steam, or by causing a metallic alkoxide, or a halogenated hydrocarbon to react with chloracetic acid, or with potassium cyanide, and saponifying the product thus obtained. Such products or mixtures thereof, having at least 8 and not more than 32 carbon atoms, and having at least one carboxy group or the equivalent thereof, are as suitable for use as the conventional detergent-forming monocarboxy acids, and another analogous class equally suitable, is the mixture of carboxylic acids, obtained by the alkali treatment of alcohols of higher molecular weight formed in the catalytic hydrogenation of carbon monoxide. The synthetic carboxy acids so obtained can be converted into high molal ether amines by the same procedure as employed for the conversion of other carboxy acids.

Reference has previously been made to the fact that such amines may be treated with oxyalkylating agents and such agents are preferably selected from members having not over 5 carbon atoms, such as ethylene oxide, propylene oxide, butylene oxide, methylbutylene oxide, or glycide. Similarly, the amine which is converted into an alkoxide may be treated with an oxyalkylating agent and then converted into the alkoxide. For instance, triethanolamine might be treated with metallic sodium, or sodium hydroxide, so as to convert it into the alkoxide, or triethanolamine might be treated with 1 to 15 moles of ethylene oxide, propylene oxide and the like and then converted into the alkoxide for further reaction. It is to be noted that the same oxyalkylating agent need not be employed throughout the entire process. This applies to an oxyalkylating step whenever used.

Having obtained suitable high molal hydroxylated etheramines of the kind previously described, such products are subjected to esterification with low molal monocarboxy acids having 7 carbon atoms or less. Some of such acids have been previously described in characterizing the acyl radical $R_1CO$. Additional examples of the hydroxylated type have been mentioned. Other suitable cyclic acids include furoic, unsaturated acids, acrylic, crotonic, tiglic, etc.

The esterification reactions are conducted in the usual manner. In such instances where there are two polyglycol radicals present, one may introduce a low molal acyl radical as a substituent for each terminal hydrogen atom. It is my preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent, such as an anhydride or other suitable derivative.

In the instance of acids having boiling points in excess of 175° C., for instance, normal caproic acid, it is my preference to add a stoichiometric equivalent and conduct the reaction until the amount of water eliminated is equal to, or almost equal to, the theoretical yield. Hydroxyacetic acid may be employed in the same manner.

In the following examples, reference is made to the use of certain low molal acids. Actually, the esterification reaction can be accelerated by use of the anhydride, i. e., using one mole of the anhydride to replace 2 moles of acid, except in such instance where there is no objection to excess acid and where the excess acid or excess anhydride is subsequently removed, one may replace each mole of acid by one mole of anhydride. Particular reference is concerned with the use of acetic anhydride, propionic anhydride, n-butyric anhydride, isobutyric anhydride, n-valeric anhydride, n-caproic anhydride, and particularly the last five where the boiling points of the anhydrides vary from 169° to 242°. When the corresponding acid is formed, such acid may serve as a reactant in the esterification reaction, or can be removed by vacuum distillation. Reference has been made to the acids, only because they are more generally available, but where the acyl chloride is available, the anhydride can be obtained from the acyl chlorides and the salt or by other suitable means.

It has been pointed out that the herein contemplated hydroxylated ether amines used as reactants are basic in character. Thus, the initial reaction between the amine and the low molal carboxy acid results in salt formation. The esterification reaction involved the elimination of water from the salt. However, the esterified amine herein contemplated is still basic in character and combines with acids, particularly acids to form salts, and this has been pointed out previously in the hereto appended claims. Reference to the amines includes the anhydro base, the hydrated base, i. e., the ammonium form, or any suitable salt, including salts of the various low molal carboxy acids herein contemplated as reactants. This means, among other things, where an excess of the low molal acid or anhydride is used for esterification, as much as a mole of such acid may be retained, insofar that the esterified high molal amino-polyglycol may be in essence a salt and not the anhydride base. The salts of the low molal acids tend to revert to the free base, and the acid itself, under such conditions which tend to remove the acid, i. e., vacuum distillation. The salt form, particularly the salts of the low molal carboxy acids are perfectly satisfactory for the purpose herein contemplated, and when dissolved in solutions of stronger acids such as sulfuric acid-hydrochloric acid, phosphoric acid, nitric acid, etc., and acid exchange reaction takes place, and such solution may be particularly effective for those purposes wherein an acidic combination is indicated.

Previous reference was made to the fact that etheramines containing either one or two aminohydrogen atoms can be treated with oxyalkylating agents having a reactive ethylene oxide ring. Such elimination of any amino-hydrogen atom serves two purposes: in the first place, the formation of amides are eliminated, and in the second place, if a reactive hydroxyl radical were not previously present, it is so supplied for reaction with a low molal carboxy acid, or the like.

It is to be noted that the same oxyethylation agent need not be employed throughout the entire oxyethylation process. For instance, the secondary amine dioctylamine might be reacted with one mole of ethylene oxide, and two moles of propylene oxide, or such compound might be treated with one mole of glycide and then with 2 or 4 moles of ethylene oxide. It would be equally feasible to use 2 moles of ethylene oxide and then one mole of glycide. This same procedure could be applied just as effectively to primary amines.

Its special significance is as follows: If a secondary amine indicated by

is treated with 2 moles of ethylene oxide to give

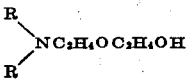

such product could then be treated with one mole of glycide to give a diol group as follows:

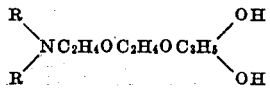

Such product has the advantage that after being reacted with a low molal monocarboxy acid, there is present an available hydroxy radical for further reaction.

Previous reference has been made to the fact that many of the amines herein contemplated as reactants, may be considered conveniently as derivatives of high molal monocarboxy acids, and particularly higher fatty acids. Some of these higher fatty acids, such as hydroxystearic acid, ricinoleic acid, dihydroxystearic acid, dichlororicinoleic acid, etc., may contain at least one hydroxyl radical. If such products are converted into amines, the radicals R in the formulae immediately preceding, also include an additional alcoholic hydroxyl radical.

As will be indicated hereafter, the low molal acid which reacts with an alcoholic hydroxyl group, may also, in turn, contain a reactive hydroxyl radical, as in the instance of lactic acid or hydroxyacetic acid, or the like.

In regard to the oxyalkylation of high molal amines without such amines being etheramines, attention is directed to the various patents. For instance, reference is made to U. S. Patent No. 2,174,762, dated October 3, 1939, to Schuette et al. Such patent is concerned with oxyethylation of amines sufficient to produce water solubility. In the present instance, the number of recurring ether linkages in any single chain are preferably limited to 3, and water-solubility may or may not occur. In other words, an oxyethylated high molal amine which is water-insoluble may serve as an intermediate reactant.

Also see U. S. Patent No. 2,195,194, dated March 26, 1940, to Ulrich et al. As to methods which can be readily adapted for the oxyalkylation of high molal amines, as herein contemplated, see U. S. Patent No. 2,275,470, dated March 10, 1942, to Ruark, and U. S. Patent No. 2,337,004, dated Dec. 14, 1943, to Schwoegler.

The following reactions are purely by way of illustration and the description is substantially that appearing in the above mentioned patents. Etheramines have been substituted for the reactants therein noted, but other reacting conditions can be maintained without change, insofar that the presence of the ether linkage does not affect reactivity towards the reactants employed for oxyalkylating.

*High molal etheramino-polyglycol, Example 1*

1 pound mole of an amine of the following composition:

is caused to react with 1 molecular proportion of epichlorhydrin which is added to the reaction mixture in small proportions, after which 2 molecular proportions of ethylene oxide are then brought into reaction at 0° C. in the presence of 0.5% of sodium ethylate. The reaction can also be conducted conveniently if suitable caution is employed and at the same temperature, or slightly higher temperature, by using glycide instead of the epichlorhydrin. This has the advantage that no hydrochloric acid is liberated to form a salt.

*High molal etheramino-polyglycol, Example 2*

The secondary amine used in the prior example is replaced by 1 pound mole of

The above amine may be esterified without a prior oxyalkylation step, but preferably, is oxyalkylated in the same manner as the secondary amine in the prior example.

*High molal etheramino-polyglycol, Example 3*

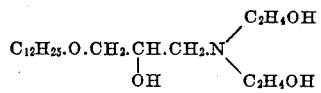

is prepared according to the directions previously noted, and used as such or after reaction with 3 to 9 moles of ethylene oxide in the manner previously described.

*High molal etheramino-polyglycol, Example 4*

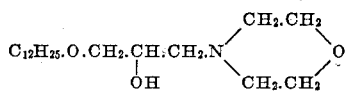

is used instead of the amine described in Example 1, preceding. 4 moles of ethylene oxide are used instead of 2 moles of ethylene oxide. Such an amine may be esterified without the prior oxyalkylation step.

*High molal etheramino-polyglycol, Example 5*

An amine of the following composition is prepared in accordance with previous directions:

$$C_{14}H_{29}.O.CH_2.CH.CH_2.N\underset{OH}{|}-\underset{CH_2OH}{\overset{H}{|}}C-CH_2OH$$

with CH$_2$OH

The above amine may be used as such, or after reaction, with 4 to 12 moles of ethylene oxide in the previously described manner.

*High molal etheramino-polyglycol, Example 6*

An amine of the following composition:

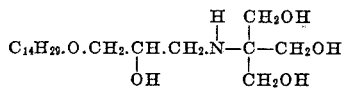

is reacted in the manner described under the heading "Example 5," immediately preceding, and may also be used directly for esterification without oxyalkylation.

*High molal etheramino-polyglycol, Example 7*

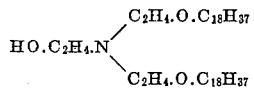

is obtained in accordance with previous directions, and used as such or after being subjected to oxyethylation with 2 to 6 moles of ethylene oxide.

Having obtained suitable high molal hydroxylated etheramines of the kind previously described, such products are subjected to esterification with molal monocarboxy acids having 7 carbon atoms or less. Some of such acids have been previously described in characterizing the acyl radical R$_3$CO. Additional examples of the hydroxylated type have been mentioned. Other suitable acids include cyclic acids, such as furoic, and unsaturated acids, such as acrylic, crotonic, tiglic, etc.

The esterification reactions are conducted in the usual manner. In such instances where there are two polyglycol radicals present, one may introduce a low molal acyl radical as a substituent for each terminal hydrogen atom. It is my preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent such as an anhydride or other suitable derivative.

In the instance of acids having boiling points in excess of 175° C., for instance, normal caproic acid, it is my preference to add a stoichiometric equivalent and conduct the reaction until the amount of water eliminated is equal to, or almost equal to, the theoretical yield. Hydroxyacetic acid may be employed in the same manner.

In the following examples reference is made to the use of certain low molal acids. Actually, the esterification reaction can be accelerated by the use of the anhydride, i. e., using one mole of the anhydride to replace 2 moles of acid, except in such instance where there is no objection to excess acid, and where the excess acid or excess anhydride is subsequently removed, one may replace each mole of acid by one mole of anhydride. Particular reference is concerned with the use of acetic anhydride, propionic anhydride, n-butyric anhydride, isobutyric anhydride, n-valeric anhydride, n-caproic anhydride, and particularly, the last five, where the boiling points of the anhydrides vary from 169° to 242°. When the corresponding acid is formed, such acid may serve as a reactant in the esterification reaction, or can be removed by vacuum distillation. Reference has been made to the acids only because they are more generally available, but where the acyl chloride is available, the anhydride can be obtained from the acyl chlorides and the salt or by other suitable means.

It has been pointed out that the herein contemplated amines used as reactants are basic in character. Thus, the initial reaction between the amine and the low molal carboxy acid results in salt formation. The esterification reaction involves the elimination of water from the salt. However, the esterified amine herein contemplated is still basic in character and combines with acids.

*Ester of high molal etheramino-polyglycol Example 1*

1 pound mole of the product described under the heading "High molal etheramino-polyglycol, Example 3" is heated with 2 pound moles of isobutyric acid for approximately 8 to 18 hours at 150–154° C. The esterification is conducted by means of a hot condenser, that is, a condenser with the temperature regulated so as to be maintained at approximately 105° C.–112.5° C. Such arrangement permits the elimination of much, if not all, of the water of esterification, but condenses and returns substantially all of the butyric acid for further reaction. The progress of the esterification reaction can be followed by the use of a second trap condenser to retain and measure the water of reaction. Such water should be titrated for determination of any acid which may have distilled over. At the end of such esterification period the excess butyric acid is eliminated by distillation, and if preferred, vacuum distillation may be employed. The final product is substantially free from uncombined butyric acid. The amount of base required for saponification of the ester is, of course, a means of measuring the degree of esterification. Saponification reliberates the butyric acid. The product shows excellent solubility in dilute acetic acid or dilute mineral acid. The product derived from commercial raw materials is an amber-colored, viscous or paste-like compound at ordinary room temperature, and if contaminated by the presence of metallic iron or the like, may show even a darker appearance. The salt forms are more solid in nature, than the anhydro base. Such appearance is typical of the entire class of materials herein described.

*Ester of high molal etheramino-polyglycol*
*Example 2*

The high molal etheramino-polyglycol described under the heading of Example 1, is substituted for the high molal etheramino-polyglycol used in the preceding example.

*Ester of high molal etheramino-polyglycol*
*Example 3*

The same procedure is followed as in the preceding two examples, except that high molal etheramino-polyglycols having at least one ether linkage, and preferably, two ether linkages, and obtained by the use of glycide alone, or glycide in combination with ethylene oxide in the manner described in high molal etheramino-glycols, Examples 3 to 7, inclusive, are substituted for Examples 1 and 2 in the preceding example.

*Ester of high molal etheramino-polyglycol*
*Example 4*

The same procedure is followed as in the two preceding examples, with the exception that, instead of using 8 moles of the low molal acid per mole of etheramino-polyglycol, one employs only a single mole, i. e., sufficient low molal acid to convert only one hydroxyl radical into an ester radical. Under such circumstances, the yield may not be as large as in preceding examples, and there may be some minor portions of uncombined reactants remaining in the final product. This does not interfere with the use of the compounds for various purposes, as hereinafter described. One mole of anhydride may be used for 2 moles of etheramino-polyglycol.

*Ester of high molal etheramino-polyglycol,*
*Example 5*

Esterification is conducted by means of an acid having a substantially higher boiling point, such as normal caproic acid. Under such instances, no excess of acid is necessarily added, and one may use either one mole of acid or 2 moles of acid, depending upon whether there are as many as 2 hydroxyl radicals present per mole of etheramino-polyglycol, and also depending upon whether or not one desires to convert both hydroxyl radicals, if present, into ester radicals. The temperature of esterification is approximately 175°–195° C., and the condenser employed is a cold condenser with suitable arrangement to trap the water of esterification as formed and also return any unreacted acid for further reaction. (Such arrangement is suitable where the acid is volatile and water-insoluble.) There is no difficulty in regard to the loss of the low molal acid, because, although it is volatile at the indicated temperature, yet it is readily condensable. Thus, as specific procedure illustrating the present example, one may use 1 mole of etheramino-polyglycol, Example 3, preceding, and 1 mole of caproic acid, or else one mole of the other, previously employed etheramino-polyglycol; one may employ 2 moles of caproic acid in such instances where it is desired to convert both hydroxyl radicals into ester radicals.

*Ester of high molal etheramino-polyglycol,*
*Example 6*

The same procedure is employed as in the previous example, except that anhydrous hydroxyacetic acid is employed instead of caproic acid. One obtains the monohydroxyacetate if the high molal etheramino-polyglycol, Example 1, is employed, and one may obtain either the monohydroxyacetate or the di-hydroxyacetate, as previously explained, in the event other polyhydric amino-polyglycols are employed.

Previous reference has been made to high molal etheramino-polyglycols as reactants, for the reason that it is my preference to employ products in which there is at least one ether linkage obtained by the use of 2 or more moles of ethylene oxide per aminohydrogen atom. If desired, however, one may employ a single mole of the oxyalkylating agent, such as ethylene oxide, for each available aminohydrogen atom. In such event, the product obtained is not a polyglycol but an aminoalcohol, insofar that there is a single alkylene radical present and no ether linkage. Such type of reactant may be employed in the present instance, if desired. Regardless of what type of reactant is employed, the final product is invariably soluble in or produces a colloidal sol in dilute acetic acid or dilute mineral acid. Completeness of reaction can be checked in each instance in the manner previously indicated.

In the case of hydroxyacetic acid, one may use a distinctly higher temperature without volatilization of the acid than in the instances where caproic acid is employed. For instance, the esterification involving hydroxyacetic acid may employ a temperature as high as 215° C.

Many of the preceding examples will be found to be soluble in water, even in the absence of acid. Some of the products are soluble in or produce a turbid sol or suspension in gasoline, kerosene, benzene, or cresol.

Previous reference has been made to the use of the anhydride as an acylating agent instead of the free acid. Probably salt formation is eliminated until esterification begins with liberation of a molecule of acid for each molecule of anhydride added. The liberated acid acts, of course, as if it had been added at the beginning of the reaction, and additionally, presents a modification in that water is not eliminated unless esterification takes place by virtue of the free acid. If, however, the entire esterification reaction involves only the anhydride and no acid, water would not be liberated. Thus, the measurement of the condensed water, if any, under such circumstances is not necessarily an index of esterification. Other procedure must be used, although unfortunately, no method of measurement is available, which is relatively quick and absolutely satisfactory to a precise and quantitative degree. If a salt is formed, titration with caustic soda or potash converts the salt into the free base. The particular end point using the usual indicators is rather indefinite, and thus, the use of additional alkali to determine the saponification value results in a determination of somewhat approximate value, due to such difficulties of analytical manipulation. The values obtained, however, even though only approximate, are perfectly satisfactory for the present purpose. Other suitable procedure but more laborious, involves the saponification of the product, followed by acidification with a non-volatile mineral acid, e. g., sulfuric acid, and distillation of the low molal carboxy acids which were originally combined in ester or salt form, followed by the usual volumetric procedure in correlation to the original sample.

The following reactions illustrate the formula of the high molal etheraminoalcohols and etheramino-polyglycols, and also their esterification products without reference to the formation of the hydrated base or of a salt form of the anhydro base. In the subsequent structural illustrations where $R_1$ appears, it is assumed, for convenience, that $R_1$ in such instance as illustrated does not include a hydroxyl radical. Oxyalkylation under such circumstances must, of necessity, involve the aminohydrogen atom. Actually, it would not matter if the radical indicated by $R_1$ does contain a hydroxyl radical for the reason that the linkage involving a hydrogen atom and an amino-nitrogen atom, as contemplated in the herein described reactants, appears to be more susceptible to oxyalkylation than the hydrogen oxygen linkage of the hydroxyl group. After the first mole of oxyalkylating agent is introduced into the amino-hydrogen position, whether it be ethylene oxide or glycide, the resulting radical is the equivalent of $R_1$ in such instances where $R_1$ does contain an alcoholic hydroxyl group. It would not matter if the next mole of oxyalkylating agent attacked the hydroxyl of $R_1$ or the hydroxyl of the alcoholic group which replaced the aminohydrogen atom. Stated in another way, if $R_1$ is a hydroxylated radical, then $R_2OH$ and $R_1$ would be the equivalent of each other, and $R_3COOH$ in the resulting esterification reaction would combine as readily in most instances with the $R_1$ radical as with the $R_2OH$ radical. One must not lose sight of the fact that esterification must involve a tertiary amine, and thus eliminate amidification as a possible reaction. If $R_1$ does contain an alcoholic hydroxyl and is reactive, and if the amine is the secondary amine, then in each instance the reaction must be conducted by use of suitable quantities of an alkylating agent so as to eliminate the aminohydrogen atom.

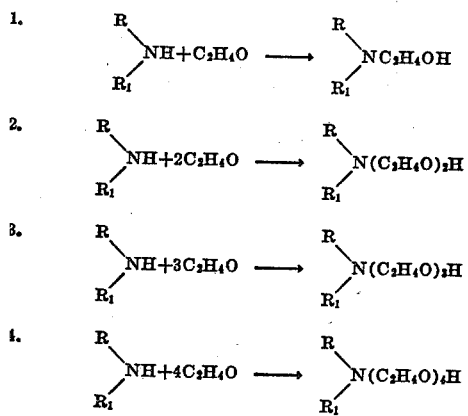

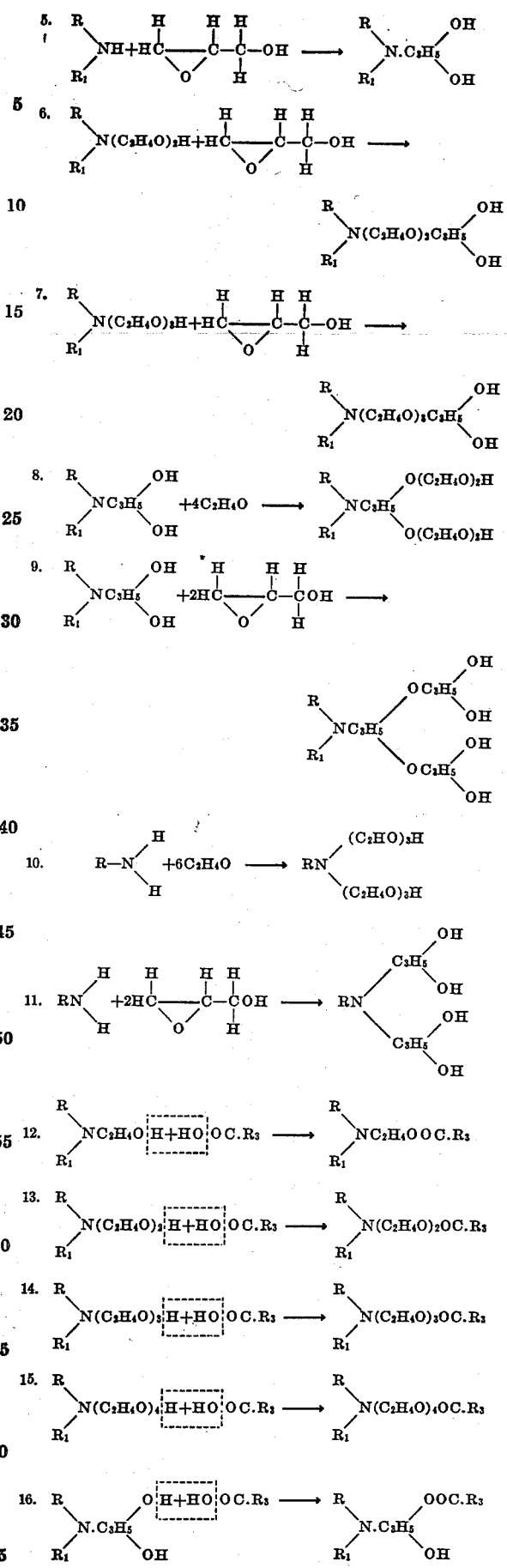

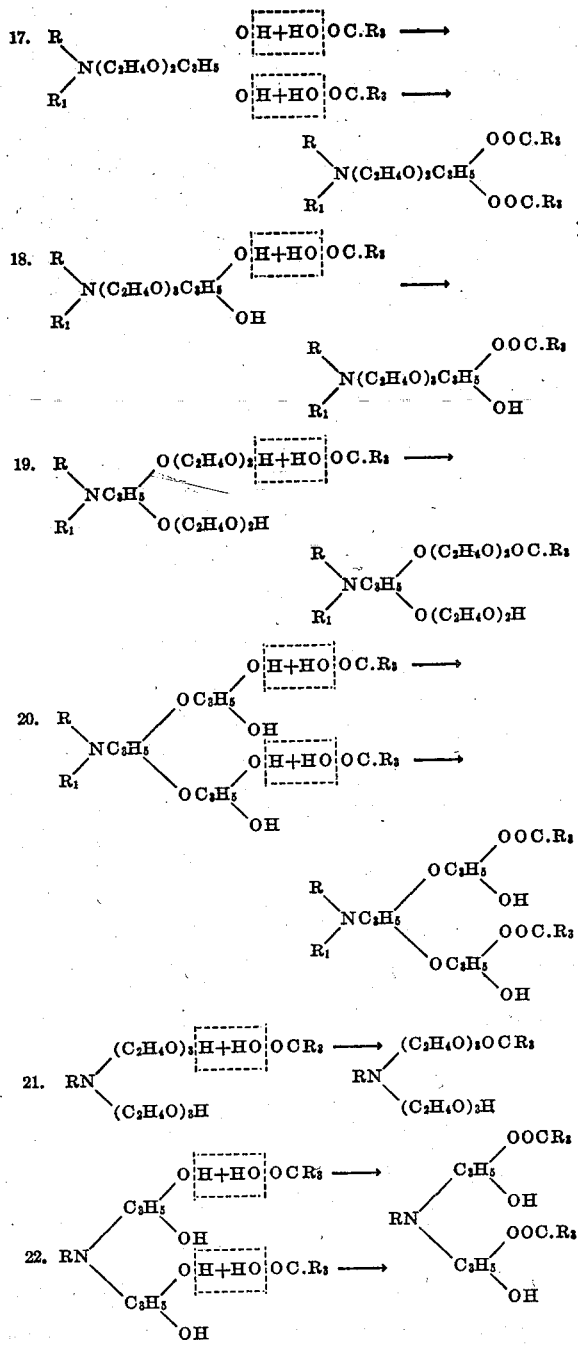

As will be noted, in such instances where butylene oxide replaces ethylene oxide, the number of carbon atoms in the polyglycol attached to the amino nitrogen N may be as high as 15.

In light of the previous description and formulae, the structure of the compounds originally presented may be advantageously summarizd as follows:

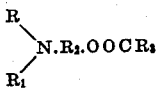

in which R is an ether radical having as an integral part thereof a hydrocarbon radical containing 8 carbon atoms and not more than 32 carbon atoms, and more particularly, an alkyl radical, an alicyclic-alkyl radical, or an aralkyl radical in which a carbon atom chain is interrupted at least once by an oxygen atom and at least one such carbon atom attached to an ethereal oxygen atom, is an acyclic carbon atom; $R_1$ is the same as R without the lower limitation of 8 carbon atoms, or $R_1$ may be any non-aryl hydrocarbon atom radical having 7 carbon atoms or less, and especially, alkyl, aralkyl, and alicyclic in character, or additionally, $R_1$ may be hydroxyalkyl, including hydroxyalkyl radicals, where the carbon atom chain is interrupted at least once by an oxygen atom, provided that the alkylene radical of said immediately aforementioned alkyl and hydroxyalkyl radicals contain less than 8 carbon atoms. $R_2$ is a divalent radical having less than 16 carbon atoms and not more than 3 ether linkages and a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene, and methylbutylene, and $R_3CO$ is an acyl radical of a low molal monocarboxy acid having less than 8 carbon atoms.

In view of the lower cost of primary amines in comparison with secondary amines, it is my preference to employ hydroxylated etheramines obtained by the oxyalkylation of primary amines, and particularly those in which the amine radical R is derived from higher fatty acids, and especially those having 18 carbon atoms.

Reference to an esterified etheraminoalcohol and the other amino-glycol or amino-polyglycol compounds herein contemplated, is intended to include the salts and the anhydro base, as well as the hydrated base, since both obviously are present when an emulsion is treated with an amine or amino compound. ("In an aqueous solution of the amine, the anhydro base, R—$NH_2$, the hydrated base, R—$NH_3$—OH, and the 2 ions are all present." Richter, s. v., page 252.)

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my herein described process for resolving petroleum emulsions, may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent employed in my process, is based upon its ability to treat certain emulsions more advantageously and at a somewhat lower cost than is possible with other available demulsifiers or convention mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process for resolving petroleum emulsions of the water-in-oil type, a treating agent or demulsifying agent of the kind above described is brought into contact with or caused to act upon the emulsion to be treated in any of the various apparatus now generally used to resolve or break petroleum emulsions with a chemical reagent. The above procedure may be used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

Reference is made to my co-pending applications, Serial Nos. 542,233, 542,234, 542,235, 542,237 and 542,238, filed June 26, 1944.

Since the herein described products are esters, it is hardly necessary to point out that saponification decomposes the product into its original components, to wit, an amine and an acid or acids. Actually, the acids are obtained in the form of salts, usually the sodium or potassium salts. Such conversion into the original components or simple modifications thereof results in products which can be examined in the customary manner, and thus serve to identify the esterified amino alcohol.

Having thus described my invention, what I claim as new and desire to secure by Letters Patent is:

1. A process for breaking petroleum emulsions of the water-in-oil type, characterized by subjecting the emulsion to the action of a demulsifying agent comprising a basic esterified ether-aminoalcohol of the formula:

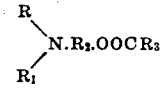

in which R is an ether radical having as an integral part thereof a hydrocarbon radical containing not less than 8 carbon atoms and not more than 32 carbon atoms, and selected from the class consisting of alkyl radicals, alicyclic-alkyl radicals, and aralkyl radicals in which a carbon atom chain is interrupted at least once by an oxygen atom and at least one such carbon atom attached to an ethereal oxygen atom is an acyclic carbon atom; $R_1$ is a member of the class of radicals consisting of (a) the same radical as R without the lower limitation of 8 carbon atoms; (b) non-aryl hydrocarbon radicals having 7 carbon atoms or less and in turn selected from the group of alkyl radicals, aralkyl radicals and alicyclic radicals; (c) hydroxyalkyl radicals and hydroxyalkoxy radicals in which the alkylene radical contains less than 8 carbon atoms; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals, in which any alkylene radicals present are selected from the group consisting of ethylene, propylene, butylene and methylbutylene, and $R_3CO$ is an acyl radical of a low molal monocarboxy acid having less than 8 carbon atoms.

2. The process of claim 1, wherein the number of carbon atoms in any alkylene radical does not exceed 3.

3. The process of claim 1, wherein the number of carbon atoms in any alkylene radical does not exceed 3 and R is aliphatic.

4. The process of claim 1, wherein the number of carbon atoms in any alkylene radical does not exceed 3 and R is alicyclic.

5. The process of claim 1, wherein the number of carbon atoms in any alkylene radical does not exceed 3 and R is aralkyl.

MELVIN DE GROOTE.